Patented May 16, 1939

2,158,663

UNITED STATES PATENT OFFICE 2,158,663

PROCESS FOR MANUFACTURING SOAP

Carl Leyst-Küchenmeister, Schlachtensee, near Berlin, Germany

No Drawing. Application November 7, 1934, Serial No. 751,882. In Germany September 24, 1934

4 Claims. (Cl. 87—16)

This invention relates to the art of soap manufacture and has for its object the provision of a novel process for manufacturing soap in a cold state.

Another object of the invention is to provide a process for manufacturing soap in a cold state by the use of waste sulphite lyes derived from cellulose industries.

I have found during long years of experience that all cellulose mixtures, either containing wood or maize straw or papyrus, i. e., all raw materials used in the manufacture of paper, must be boiled with an extra quantity of active chemicals. In the boiling lye, there must be provided an excess of said lye in order to avoid the presence of immature quantities of cellulose. For example species of wood are boiled with 3.2–3.5% of fresh sulphite lye, species of straw with 16% and bamboo species with 18–22% of alkalis.

Since it is technically impossible to consume up to 100% of these quantities of lyes during the boiling process there must be always present some of the chemical potential of the fresh lyes which cannot be consumed during the boiling process but which are necessary in order to ensure the solution of older straw molecules or wood molecules which are richer in pectin or lignin.

Thus, there are left mainly chemical potentials in the boiling lyes which remain only half used in the waste lyes. These remaining potentials consist of latent reactions which can now be completely used up in a new chemical process of reaction and at the same time highly valuable service can be rendered from an economical standpoint.

This depends decisively on these still latent reactions in all chemical waste lyes; they represent, although heretofore unknown and therefore unconsidered, high values.

The new effects of these reactions may now be utilised according to my invention in the saponification process under the following chemical aspects:

A. The latent reactions, particularly of the sulphite, monosulphite and bisulphite waste lyes and all sulphurous waste lyes, permit of no salting-out in the saponification process. They, therefore, save spent lyes and transform and help to saponify uniformly the whole mixture of fat, alkalis and waste lyes. The formation of spent lyes, regarded mistakenly as desirable according to old theories of saponification and necessitating a complicated heating process with the consequent high wages, is now recognised as a disadvantage, which is eliminated according to my invention, as the salting-out step becomes superfluous.

B. The latent reactions of the chemical waste lyes necessitate however accurate mixtures, complementing each other chemically, with proportions of waste lye, fat and alkaline fresh lye. It was heretofore not recognised, especially in connection with chemical waste lyes for glue and similar purposes how the exact quantities act on each other. The exact measurement of these quantities however plays an important part. The co-saponification of the chemical waste lyes, which must be prepared in a form yet to be discussed, is effected in utilisation of the latent reactions only in such a way as, for example, the unheated application of $27\frac{1}{2}$ kilos of prepared sulphite waste lye to 55 kilos of cocoanut oil. If a larger quantity of prepared waste lye is added, the saponification will certainly be effected, but fluid soap will be obtained.

C. Not less important is the preparation of the chemical waste lyes. If sulphite waste lye is co-saponified, the concentration must be $33\frac{1}{3}$ i. e., $33\frac{1}{3}$ kilos out of 100 kilos. The same applies to fermented sulphite lye which was previously used for spirits. The same also applies to mono-sulphite and bisulphite waste lyes.

D. If it is a question of using caustic soda, sulphate, carbonate or salt or lime waste lyes, they must be concentrated to 70–80% i. e., from 100 to 30 or 20 kilos.

E. Not less important is the measuring of the quantity of the caustic soda lye which saponifies the cocoanut oil and prepared lyes.

Of special importance is the order:

A. 55 kilos of cocoanut oil with 27.5 kilos of prepared sulphite waste lye, which is fermented or unfermented, produces with 27.5 kilos of caustic soda lye, 109 kilos of soap which has become known in the trade as "Black hand soap", since it completely cleans the dirtiest hands of factory workmen. This soap now takes off even the heaviest oil and even graphite dirt from the hands and lathers and washes in sea water containing up to 4% of salt.

B. If the above-mentioned 27.5 kilos of prepared fermented or unfermented sulphite waste lye is not added until after the 27.5 kilos of 40° grade caustic soda lye, that is to say, last of all, then, the finished "black hand soap" will wash in sea water containing up to 6% of salt and in saline lye water containing up to 10% and more of salt.

C. If of 27.5 kilos of fermented or unfermented sulphite waste lye only 13.75 kilos are added to 27.5 kilos of cocoanut oil which has been melted prior to its utilization at about 30° C. and after adding 27.5 kilos of caustic soda lye thereto, 13.75 waste lye will then be added last of all, from which results a soap which possesses the highest degree of efficiency in water which may contain up to 5% of salt and which may clean any oil dirt on the hands. The same applies, if monosulphite, bisulphite and other sulphurous soaps or soap compounds containing sulphur powder are used.

If sulphate, caustic soda, lime and other alkaline waste lyes are treated at the same time, consideration must be given to the fact that the fresh caustic soda is accordingly reduced in the mixture.

The soap mass in accordance with this process can be mixed, up to a proportion of 5, 10, 15, 20, 25% to 50% and more, with all other toilet soaps in a liquid state and in this way medically and hygenically valuable soaps are obtained. If the quantity of the prepared lyes added is increased, thin soaps are obtained which give good results as soft soaps and are particularly valuable for spraying purposes, e. g. for cleaning electrical tramcars, the paint-work on the cars being not dissolved, when this soap is sprayed on.

A further example is now given: 55 kilos of cocoanut oil, melted at a temperature of 30° C. are slowly stirred with 27.5 kilos of caustic soda lye; then 27.5 kilos of prepared fermented or unfermented sulphite waste lye are added and stirred until the co-saponification has been effected. Or half of the prepared waste lye is first added and stirred and the second half last, or the whole quantity last. Then 200 grammes of cheap soap perfume are added to the mixture and stirred with it. The saponified mass is poured into a soap mould; this is covered with sacks and pads and the whole is left to become rigid. In addition, by way of example, the $SO_2$ still present, can be driven out of the sulphite waste lye by heat and stirrers and the calcium still contained in it can be previously precipitated by means of soda.

The term waste sulphite lye hereinabove used and incorporated in the claims is identified by the material which is commonly designated in the art and trade as waste sulphite liquor.

I claim:

1. A process of manufacturing soap which consists in saponifying a fatty material in liquid state with waste sulphite lye derived from cellulose industries together with freshly prepared caustic soda lye.

2. A process of manufacturing soap which consists in the saponification of cocoanut oil having a temperature of 30° C. with waste sulphite lye derived from cellulose industries, together with freshly prepared caustic soda lye.

3. A process of manufacturing soap which consists in saponifying a liquid fatty material with freshly prepared caustic soda lye together with a prepared quantity of waste sulphite lye derived from cellulose industries, half of said quantity of waste lye being first stirred with said material and said soda lye, the remainder of said quantity of said waste lye being then added thereto.

4. A process of manufacturing soap which consists in the saponification of substantially 55 parts by weight of liquified cocoanut oil with substantially 45 parts by weight of caustic soda lye and waste sulphite lye, said soda lye and said sulphite lye being prepared in concentrated form prior to their application.

CARL LEYST-KÜCHENMEISTER.